Jan. 24, 1939.  W. L. HANSEN  2,144,656
MINIATURE ELECTRIC MOTOR
Original Filed Sept. 9, 1936
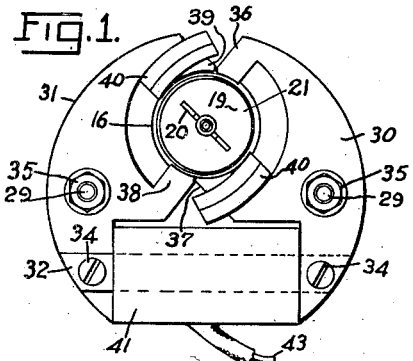
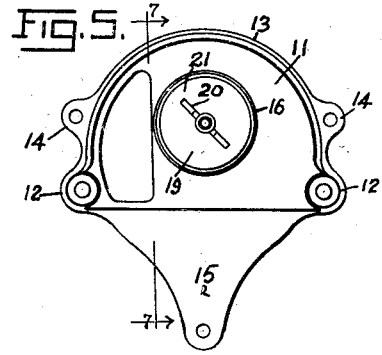
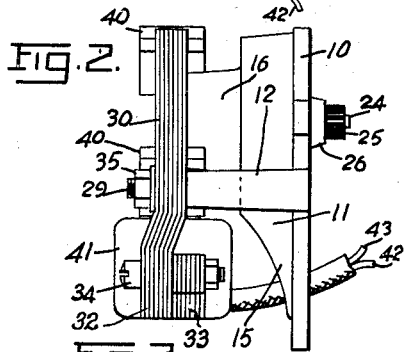
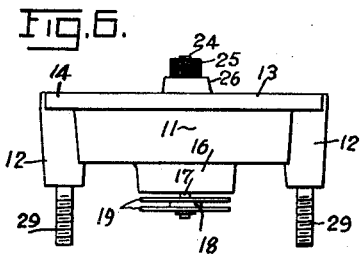
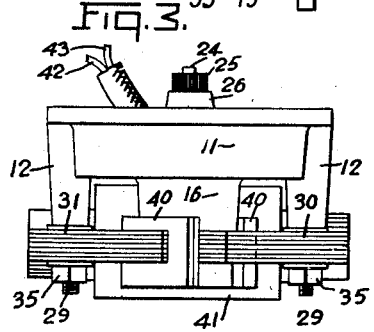
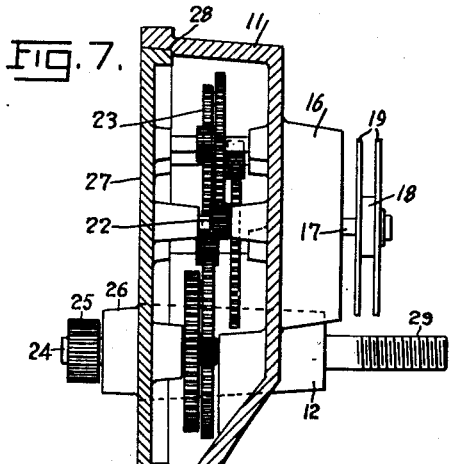
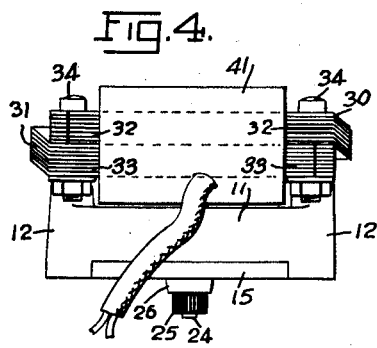
WILLIAM L. HANSEN Patented Jan. 24, 1939

2,144,656

UNITED STATES PATENT OFFICE 2,144,656

MINIATURE ELECTRIC MOTOR

William L. Hansen, Princeton, Ind., assignor to Hansen Mfg. Company Inc., Princeton, Ind., a corporation of Indiana Original application September 9, 1936, Serial No. 100,027. Divided and this application November 15, 1937, Serial No. 174,506

3 Claims. (Cl. 172—278)

This inventon relates to miniature electric motors, and in particular, to electric motors for operating secondary clocks.

One object of this invention is to provide a miniature electric motor having a casing, with means associated therewith for aligning the field plates in the vicinity of the poles and rotor.

Another object is to provide a miniature electric motor having a casing with an aligning portion adjacent the rotor, and adapted to align the field plates of the motor in the vicinity of the poles and rotor so as to prevent any possibility of the rotor engaging the poles, yet maintaining a very narrow air gap of an accurate, predetermined width therebetween.

This application is a division of my copending application, Ser. No. 100,027, filed September 9, 1936.

In the drawing:

Figure 1 is a front elevation of the miniature electric motor of this invention, with the field plate structure in position.

Figure 2 is a side elevation of the motor shown in Figure 1.

Figure 3 is a top plan view of the motor shown in Figure 1.

Figure 4 is a bottom plan view of the motor shown in Figure 1.

Figure 5 is a front elevation similar to Figure 1, but showing the casing and rotor unit only, the field plate structure having been removed.

Figure 6 is a top plan view of the casing and rotor unit shown in Figure 5.

Figure 7 is an enlarged vertical section along the line 7—7 in Figure 5.

In general, the miniature electric motor of this invention consists of a casing with a rotor rotatably supported thereon, the casing containing appropriate reduction gearing if the motor is to be used for operating a secondary clock. Immediately adjacent the rotor is an aligning portion for engaging the field plate structure of the motor in the vicinity of the rotor so as to accurately position the field poles relatively to the rotor, yet prevent actual contact therebetween. This aligning portion is preferably of cylindrical or conical configuration, and cooperates with the means for securing the field plates to the motor casing.

Referring to the drawing in detail, Figures 1 and 2 show the motor of this invention as having a casing 10 with a gear box 11 forming a part thereof, and projecting bosses 12 on either side thereof (Figure 6). The casing 10 is provided with a base plate 13 having lateral ears 14 and a downwardly projecting portion 15 for securing the motor to any suitable support (Figures 5 and 6).

Projecting outwardly from the gear box 11 is an aligning member 16 preferably of cylindrical or slightly tapered conical form, as shown in Figure 7. The aligning member 16 serves to provde rotational support for the rotor shaft 17, upon which is mounted a non-magnetic hub 18. The non-magnetic hub 18 may be of brass, aluminum or other suitable non-magnetic material, and has secured thereto a pair of rotor discs 19 with radial slots 20 separating them into pole portions. A continuous rim portion 21 separates the slots 20 from the periphery of the rotor 19, and provides self-starting characteristics for the rotor. The rotor shaft 17 passes through the aligning portion 16, into the interior of the gear box 11 (Figure 7), where it is provided with a pinion 22. The pinion 22 meshes with and drives a train of reduction gearing, generally designated 23, terminating in the shaft 24, commonly termed the 1-R. P. M. shaft because in a clock it makes one revolution per minute.

Mounted on the shaft 24 is a pinion 25 for driving the mechanism for operating the hands of the clock. In order to provide rotational support for the shaft 24 a boss 26 is formed on the cover plate 27 fitting into the recess 28 of the gear box 11. The various elements of the reduction gear train 23 are mounted upon bearing projections or bosses formed either upon the cover plate 27 or upon the opposite inner wall of the gear box 11. The details of the reduction gear train 23 form no part of the present invention, and hence, require no detailed discussion.

In order to provide support for the field plate structure, the projecting bosses 12 are provided with threaded posts 29 mounted therein and extending outwardly in directions substantially parallel to the axis of the rotor shaft 17 and aligning portion 16. Mounted on these threaded posts 29 are field plates 30 and 31 arranged in groups. The field plates 30 and 31 are similar in shape, and are provided with integral tongues 32 and 33 (Figure 4) which overlap one another and serve to unite the two sets of field plates 30 and 31 in the single field plate assembly shown in Figure 1. The overlapping tongues 32 and 33 are held together by bolts 34 passing therethrough, whereas the field plate assembly consisting of the thus united field plates 30 and 31 is held upon the threaded posts 29 by the nuts 35.

The field plates 30 are provided with small and large pole pieces 36 and 37, respectively, whereas the field plates 31 are provided with similar small and large pole pieces 38 and 39, respectively. The large pole pieces 37 and 39 are provided with shading coils 40. The inwardly facing pole surfaces of certain of the field plates 31 engage the surface of the aligning portion 16, and are thereby caused to approach closely to the peripheral rim 21 of the rotor 19 without actually engaging the latter. In this maner the most efficient operation of the motor is insured, yet rapid and inexpensive assembly is likewise facilitated. The field plates 30 and 31 are energized by a field coil 41 wound around the multiplicity of overlapping tongue portions 32 and 33, the leads 42 and 43 of which are connected to an appropriate energizing circuit, such as the electric current mains or ordinary house circuits.

In assembling the motor of this invention the reduction gear train 23 is placed in position within the gear box 11, and the cover plate 27 secured within the recess 28. The rotors 19 and hub 18 are likewise secured on the rotor shaft 17. After the field coil 10 has been mounted upon the overlapping tongues 32 and 33 of the field plates 30 and 31, the bolts 34 are inserted to unite the assembly. Meanwhile, the shading coils 40 have been mounted upon the large poles 37 and 39, uniting each assembly of field plates 30 and 31. The field unit is then placed upon the projecting threaded posts 29, which pass through holes in the field plates 30 and 31. The holes (not shown) for the posts 29 and bolts 34 are slightly oversize in order to provide a measure of adjustability.

The inwardly facing surfaces of the poles 36, 37, 38 and 39 come to rest against the outer surface of the aligning portion 16, whereupon the nuts 35 may be tightened in order to secure the field unit in position. This arrangement spaces the poles 36, 37, 38 and 39 at an accurate predetermined distance from the peripheries 21 of the rotors 19, yet prevents actual contact therebetween. This feature, therefore, becomes of great importance in the mass production of such motors, because an accurate spacing of the parts is automatically insured without the necessity of careful attention thereto by the workman assembling the parts. The aligning portion 16 automatically takes care of the proper spacing of the poles 36, 37, 38 and 39 from the peripheries 21 of the rotors 19, and no further attention is required. It is also impossible for the user or repairer of one of these clock motors to bring the poles into engagement with the rotors, and therefore, a motor of self-aligning characteristics is obtained.

It will be understood that I desire to comprehend within my invention such modifications as come within the scope of the claims and the invention.

Having thus fully described my invention, what I claim as new and desire to secure by Letters Patent, is:

1. In a miniature electric motor, a casing, an outwardly approximately cylindrical aligning projection on said casing, field plates having pole portions arranged to engage said aligning projection, a rotor shaft rotatably supported in said casing, a rotor on said rotor shaft outside said casing with its periphery closely adjacent said pole portions, and a field coil arranged to energize said field plates, said aligning projection being disposed adjacent said rotor but spaced apart therefrom in an axial direction having portions substantially coextensive with the periphery of said rotor but of slightly larger diameter, said aligning projection extending but partially into the space between said pole portions whereby to space said pole portions at predetermined separations from said rotor periphery.

2. In a miniature electric motor, a casing, an outwardly approximately cylindrical aligning projection on said casing, field plates having pole portions arranged to engage said aligning projection, a rotor shaft rotatably supported in said aligning projection, a rotor on said rotor shaft outside said casing with its periphery closely adjacent said pole portions, and a field coil arranged to energize said field plates, said aligning projection being disposed adjacent said rotor but spaced apart therefrom in an axial direction having an approximately cylindrical configuration with a diameter slightly larger than the diameter of said rotor, said aligning projection extending but partially into the space between said pole portions whereby to space said pole portions at predetermined separations from said rotor periphery.

3. In a miniature electric motor, a casing having reduction gearing therein, a rotor shaft connected to said gearing and extending outside said casing, a rotor on said rotor shaft outside said casing, an outwardly approximately cylindrical aligning member adjacent said rotor but spaced apart therefrom in an axial direction and having aligning portions coextensive with the periphery thereof on a slightly larger diameter, field plates having pole portions engaging said aligning member for spacing said pole portions at predetermined separations from the periphery of said rotor, said aligning member extending but partially into the space between said pole portions, means for securing said field plates to said casing, and a field coil for energizing said field plates.

WILLIAM L. HANSEN.